H. HELLBERG.
SANITARY HOOK.
APPLICATION FILED AUG. 20, 1914.
1,171,198.
Patented Feb. 8, 1916.
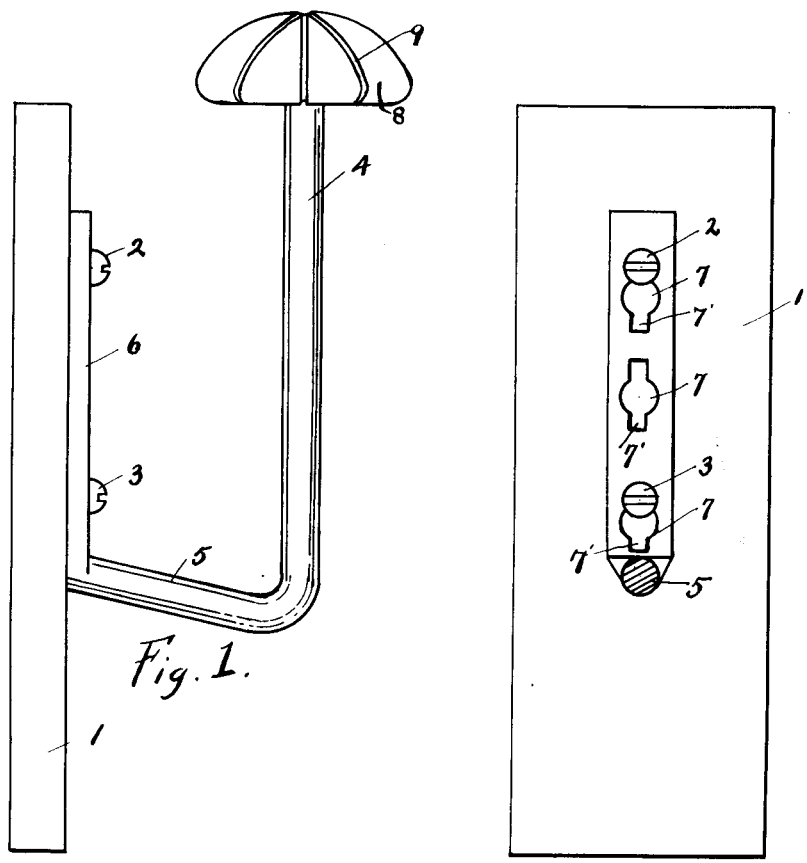
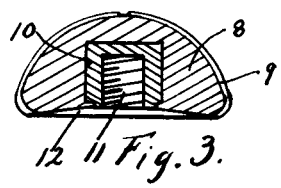
WITNESSES:
INVENTOR.
H. Hellberg.
BY
Carlos P. Griffin
ATTORNEY.

UNITED STATES PATENT OFFICE.

HENRY HELLBERG, OF SAN FRANCISCO, CALIFORNIA.

SANITARY HOOK.

1,171,198.  Specification of Letters Patent.  Patented Feb. 8, 1916.

Application filed August 20, 1914. Serial No. 857,689.

*To all whom it may concern:*

Be it known that I, HENRY HELLBERG, a citizen of the United States, residing at San Francisco, in the county of San Francisco, State of California, have invented a new and useful Sanitary Hook, of which the following is a specification in such full and clear terms as will enable those skilled in the art to construct and use the same.

This invention relates to a sanitary hook for use in hanging up measures, funnels and other dispensing devices used for liquids and its object is to drain off the measures and off the hook all of the liquid remaining in the measures or receptacles.

The invention is especially adapted for use in bars, restaurant, and others handling liquors, vinegar, wines, etc., where several kinds of liquids may in turn be placed in the receptacles. It is also especially adapted for use in dairies where it is desired to hang up measures or buckets after the same have been emptied, thereby draining off the inside of the measure or bucket of any water or milk adhering thereto.

Another object of the invention is to provide a head for the hook which will be large enough to prevent the hook from injuring the measure while at the same time it will be so grooved as to allow all the liquid in the measure, receptacle or funnel to drain out of the same.

Another object of the invention is to provide a lower portion of the hook with a support inclined away from the wall, or other support to which the hook is secured so that any liquid draining out of the measure will not run on to the wall and stain the same.

A further object of the invention is to provide means whereby the hook may be readily moved from the wall or support to which it is attached and used in any other place if desired.

An embodiment of the invention is shown in the drawing in which the same reference numeral is applied to the same portion throughout, but I am aware that there are many modifications thereof.

Figure 1 is a side elevation of the hook as it appears when secured to a wall, Fig. 2 is a front elevation of the supporting part of the hook which lies against the wall when the hook is in use, a portion of the hook being cut away for purposes of illustration, and Fig. 3 is a sectional view of the head of the hook showing the soft metal core which is threaded to be screwed on the end of the hook shank.

The numeral 1 represents a portion of a wall to which the hook is secured, large headed screws 2 and 3 being screwed into the wall for the support of the hook. The hook comprises a shank portion 4, an outwardly inclined portion 5 and a flattened wall portion 6. The wall portion of the hook is provided with a plurality of openings 7 therein which are enlarged near the center thereof and narrowed at the upper end thereof to prevent the hook from pulling over the screws when placed thereon, the larger portion of the opening being large enough to pass over on the heads of the screws 2 and 3.

It will be observed that the wall portion of the hook is provided with three openings 7, thereby enabling the user to use three screws if desired, or to cut off the wall portion of the hook and use it in a narrower place if so desired.

The upper end of the shank of the hook is provided with a large knob 8, said knob having a plurality of grooves 9 and a soft metal core 10 which is threaded at 11 to be screwed on the upper end of the shank 4. It will also be observed that the knob inclines upwardly at 12, the object being to prevent any liquid from running on to the shank 4 should it run down over the edge of the knob, but even if it should run down on the shank the outwardly inclined support 5 will direct it away from the wall. It will also be observed that the grooves 9 prevent any accumulation of liquid in the measure above the knob.

It will be understood that the hook may be made of any suitable material which is not easily corroded by the ordinary liquids and the knob upon which the measures rest may be made of any suitable material such as glass or porcelain, which will be easily cleaned and not easily corroded.

Each of the holes 7 is provided with a narrow slot 7' at the bottom thereof to prevent the hook from being easily dislodged from the supporting screws should it accidentally be raised in removing a measure therefrom.

Having thus described my invention what I claim as new and desire to secure by Letters Patent of the United States, is as follows, modifications within the scope of the claims being expressly reserved:

1. A sanitary hook comprising a member adapted to be secured to a fixed structure and having an outwardly extending portion and an upwardly extending portion, and a groove porcelain knob carried by the upwardly extending portion of the hook, said knob having its under surface reëntrant to prevent the accumulation of liquid thereupon.

2. A sanitary hook comprising a slotted member to be secured to a fixed structure, another portion integral to the slotted portion, extending outwardly and downwardly therefrom, an upwardly extending portion and a grooved porcelain knob on the upper end of the hook, said porcelain knob having its under surface reëntrant toward its top to prevent the accumulation of liquid thereon.

3. A sanitary hook comprising a slotted portion adapted to be secured to a fixed structure, and outwardly and downwardly inclined portion connected with the slotted portion, an upwardly extending portion and a grooved knob formed of a body resistant to corrosion, threaded on the upper end of said hook, said grooved knob having the central portion of its grooved under side higher than the outer edges thereof, whereby the liquid will drip off the knob and not run down the support therefor.

In testimony whereof I have hereunto set my hand this 13th day of August, A. D. 1914, in the presence of the two subscribing witnesses.

HENRY HELLBERG.

Witnesses:
C. P. GRIFFIN,
L. H. ANDERSON.